Aug. 6, 1940.　　　J. EGGERT ET AL　　　2,210,146
COLOR PHOTOGRAPHY
Filed July 1, 1936
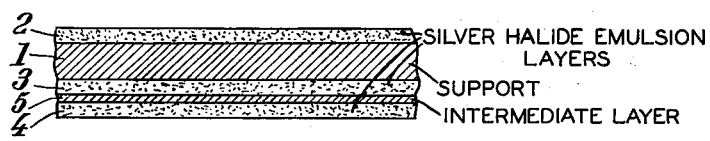
John Eggert
Gerd Heymer
　　　　Inventors
By Their Attorneys Patented Aug. 6, 1940

2,210,146

UNITED STATES PATENT OFFICE 2,210,146

COLOR PHOTOGRAPHY

John Eggert, Leipzig-Gohlis, and Gerd Heymer, Wolfen Kreis Bitterfeld, Germany, assignors, by mesne assignments, to General Aniline & Film Corporation, New York, N. Y., a corporation of Delaware Application July 1, 1936, Serial No. 88,350
In Germany July 2, 1935

4 Claims. (Cl. 95—2)

Our present invention relates to color photography.

One of its objects is an improved process of color photography. Another object is a new material for color photography. Further objects will be seen from the detailed specification following hereafter.

Reference is made to the accompanying drawing in which the single figure shows a film in accordance with the invention.

In many processes of color photography which depend on the subtractive method, there is the problem of keeping separate from each other several superimposed cast layers which are differently colored, or are subsequently to be differently colored, so that in the case of colored layers the dyestuffs do not diffuse into each other and can be treated separately, or in the case of layers which are subsequently to be dyed the simultaneous dyeing of several of them may be avoided.

This invention relates to a process in which separating layers are used. These must serve for the intended separation and at the same time must not endanger adhesion of the several layers. In addition to the separating and isolating property, the layer must be capable of conversion subsequently, by a particular treatment, into a permeable uniting layer.

The invention depends on the observation that mixtures of gelatine and cellulose esters fulfil the requirement. Suitable cellulose esters are, for instance, cellulose acetate, nitrocellulose and cellulose nitroacetate. These mixtures are so made by the invention that, owing to their gelatin content they have good adhesion, while owing to their content of cellulose derivative they are so little permeable to water that they cannot be penetrated by the solutions to be used. In order to make the layers permeable to the solutions in question, for instance dyestuff solutions, developers or the like, the layers are bathed at the required time in suitable solvents, for instance alcoholic solution of caustic potash; in this manner the cellulose derivative is saponified, whereupon it becomes permeable to water. The saponifying solution contains preferably a solvent for the cellulose derivative. The cellulose esters which are partially saponified or not completely esterified as the case may be, but which are not soluble in aqueous solutions or too strongly sensitive to water, are preferred for making the layers, since they may more easily be saponified. The layers may contain 30 to 70 parts of gelatin and 70 to 30 parts of cellulose ester. Other intermediate layers are conceivable which contain, for example, substances having at different pH-values different solubilities, for example the mixture of the substance with gelatin or another binding agent for emulsion layers may remain insoluble and permeable to water in acid or neutral solution, whereas it dissolves in alkalies, so that owing to the pores thus freely opened, the treating liquid can pass through to the layer beneath. For instance, a layer made of gelatin and the condensation product of maleic acid anhydride and colophony is impermeable to acid developers but permeable to weakly alkaline developers, and a layer of gelatin and diphenylguanidine is impermeable to alkaline developers and permeable to acid developers. Thus, any intermediate layer is suitable for the purpose of the invention which is permeable for a liquid of a particular pH-value and impermeable for a liquid of a different pH-value.

Example 1

Solution used for making the sublayers on films and containing proteid substances in an organic solvent_____cc__ 40
Acetone_____cc__ 10
8 to 10 per cent solution of cellulose acetate_____cc__ 1

A layer from this solution is completely saponified by dilute caustic potash, so that after saponification the aqueous solutions of the treating liquids which before saponification were not transmitted by said layer are now transmitted by it.

Example 2

Gelatin_____grs___ 45
Condensation product of maleic acid anhydride with colophony_____grs__ 135
Water_____cc__ 150
Phthalic acid_____grs__ 7.5
Methanol_____liters__ 1.8
40 per cent solution of formaldehyde__cc__ 2

An intermediate layer from this solution is impermeable to acid developers but is permeable to weakly alkaline developers.

Example 3

Gelatin_____grs__ 45
Diphenylguanidine_____grs__ 135
Water_____cc__ 150
Ammonia conc._____cc__ 50
Methanol_____liters__ 1.8
40 per cent solution of formaldehyde__cc__ 2

The intermediate layer made from this solution is impermeable to alkaline developers, and permeable to acid developers.

The process may be as follows: The silver bleaching-out process described by Schweitzer (French patent application No. 476,213), Christensen (German patent application No. 327,519) and Lüppo-Cramer (Eder: Ausführliches Handbuch der Photographie, vol. 2, part 1, pages 683—686) permits, particularly when silver grains are present, a bleaching-out of the dyestuff in the layers. When several such layers are superimposed on each other, it is necessary to prevent an intermixture of the dyestuffs by diffusion. By the present process the superimposed layers are separated from each other by a layer according to one of the above examples. For instance, if in the case of a two-color process the layers for the partial color pictures are arranged in superimposition on one side of a support, they are separated by an intermediate layer in accordance with the invention; if in the case of a three-color process all three layers for the partial color pictures are arranged on the same side of the support, the three emulsion layers are separated by two intermediate layers according to this invention; if in the case of a three-color process one emulsion layer is arranged on one side of a support and two emulsion layers on the other side, the two superimposed emulsion layers are separated by an intermediate layer according to this invention.

For example, films for exposure or copying may be made as follows:

On one side of a film there is formed a layer of sensitive emulsion, sensitized to green light. On the other side of the film there are two such layers superimposed. That next to the film is a red-sensitive layer and the next is a non-sensitized layer. Between these last two layers there is a separating layer which is inserted in accordance with the invention. The red-sensitive layer is protected from the action of blue light by an addition of a yellow coloring matter or by forming the separating layer as a filter layer. When the film thus constructed is exposed from the side on which there are the two layers there is produced in the upper of these a blue component and in the lower a red component. During the subsequent development first only the two external layers, that is to say the blue and the green components, are developed. Both are converted into positive colored layers by any known process, for example by dyeing with yellow or purple dyestuff and bleaching out by the silver bleach process. By bathing with alcoholic caustic potash the separating layer is rendered permeable to water and now by a suitable known process this latter layer is converted into a blue-green positive, for example by reversing to a silver positive after development and toning this positive blue. Or there may be a dyestuff component introduced previously into the layer and subsequently coupled to form a dyestuff by treatment with the necessary solution. After development of the silver picture which, if necessary, may happen simultaneously with the coupling of the dyestuff, the dyestuff may be bleached out in the manner described for the above-named layers.

Another mode of applying the invention is as follows:

It is known to be possible by the use of certain developers to overlay the silver picture with a dyestuff picture, which, after removal of the silver remains as a pure dyestuff picture suitable for the purposes of color photography. The application of the intermediate layer in this kind of procedure may be as follows: A film prepared on both sides is provided on one side with a light-sensitive emulsion and on the other side with two layers, such as have been described above. Of the two layers on the same side of the film that next to the film is mixed with a filter dyestuff and is sensitive for light which is not blue, for example the filter dyestuff is yellow and the sensitizing is for green light. Both the other layers are sensitive to blue light, or one of the layers, for instance that which is the sole layer on the one side of the film, is sensitive for the region of the spectrum for which the already sensitized layer is still non-sensitive. The two superimposed layers are in this case also separated from each other by the separating layer of the invention. On such material part-color pictures are now copied in such a manner that the copying light is adapted in color without respect to the color of the exposure light and merely to the sensitivity of that layer on which the part-picture is to be copied (as described, for example, in German patent application No. I. 40,270). For example, it is advantageous to copy the blue component on the side carrying the single layer, for instance with a blue light; the red and green components are copied correspondingly with a blue and a green filter, each on the two other layers. The film is now subjected to color development, the layer which is alone on one side being developed by floating it on a developer suitable for yellow, the outer layer on the other side being developed by a green-blue developer. The picture is now fixed and the separating layer made permeable to water as described above, the two operations being conducted simultaneously, if desired. The arrangement of the layers and the development may be any that is desired and may be adapted completely to the method of exposure; for example, when using the known LR-two-pack (German Patent 583,747) the following developer process may be used: The same copying film as described above is exposed in such a manner that there is used in the exposure apparatus for the LR-front film a green exposure filter instead of a yellow and instead of a red-brown exposure filter a blue filter. Thus the green component is in the under layer which is sensitive to green and the blue component is in the non-sensitive upper layer. The back film is copied with blue light on the third layer on the other side of the film. The development is then conducted so that the single layer on the one side of the film is developed to blue-green, the outer layer of the two superimposed layers to yellow. After making the separating layer permeable the under layer on this side of the film is developed to purple.

The intermediate layer in accordance with the invention having different permeability for liquids of different pH-value or the permeability for liquids of which can be changed by suitable treatment may be used for a new material useful in taking color pictures and may be handled as simple as the known bi-pack material, but yields three partial color pictures. One modification consists of two films which touch each other with their layer sides and in this condition pass through the camera; one of the film is provided with a single emulsion layer, whereas the other film is provided with two emulsion layers in superimposition which are separated by an intermediate layer of the above described kind which may simultaneously have the function of a filter layer. Instead of two films there may also be used a single film which is provided with three superimposed emulsion layers, each two layers being separated by an intermediate layer in accordance with the invention. Also in this case the intermediate layers may have the function of filter layers.

The essence of the invention consists in that the single layers are brought into such a condition that the partial color pictures may be separately obtained from this material. For this purpose two ways are available. According to the first way the upper of the two or three superimposed layers is developed in a developer which is not transmitted by the following intermediate layer and therefore has no action on the following emusion layers. After having developed the first partial color picture, the undeveloped silver halide may be removed from this layer by fixing. This fixing is however not absolutely necessary. Then, if required, after drying the layer, the black and white picture of the upper layer may be printed on an intermediate film with a light having a color to which the undeveloped layers of the film are not sensitive. After having printed thhe first partial color picture in this manner, the black and white picture on the original film is removed mechanically or chemically, and the following emulsion layer is developed after the intermediate layer, which hitherto has separated the two other emulsion layers, has been made permeable in a particular bath or simultaneously with the developing process. The partial color picture contained in the second layer is likewise printed on another film, as above described for the first partial color picture, or it is directly used. The third partial color picture is contained in the film provided with only one emulsion layer, if a bi-pack is used. If, however, not a bi-pack is used, but a single film with three emulsion layers in superimposition, also for the development of the second partial color picture there must be used a developer to which the intermediate layer between the second and the third emulsion layer is not permeable. The second partial color picture of such a film containing three emulsion layers in superimposition is printed on another film.

According to the second way for producing the partial color pictures, the partial color pictures in the different layers are not separated by printing them one after the other, but the separation is based on the difference of the spectral properties. For instance, one may proceed in such a manner that the uppermost layer is toned after development, or development is effected with compounds which directly after removal of the silver picture according to the process of colored development or according to the silver anti-diazotate process yield a colored picture. Then the intermediate layer is rendered permeable in the same manner as the above described intermediate layer, the following emulsion layer developed and toned in another color. It is not necessary that the color in this case corresponds with the color of the partial color picture, but is adjusted merely in accordance with the manner in which the partial color pictures of the produced color layer shall be obtained.

*Example*.—A bi-pack is used of which the front film is provided with two emulsion layers separated by an intermediate layer which is impermeable for an acid developer. The first layer next to the support is only sensitive for blue light; the layer above said first layer is sensitive to green light and protected against the influence of the blue rays by a yellow coloring throughout the emulsion layer or by a yellow coloring of the intermediate layer. The back film is a panchromatically or red sensitive film which is protected against exposure by a false light in known manner by a red filter layer. The film is furthermore preferably provided with an anti-halation layer in form of an inactinic coloring of the support. Exposure in the camera is as usual while the emulsion layers of the films are in contact. After exposure the back film is developed in the usual manner. The front film is developed by means of an acid developer, for instance, by the known ferrous oxalate developer, whereby only the picture in the uppermost layer is produced. Development is followed by a fixing operation. This fixing operation may, however, be omitted without impairing the process.

The green partial color picture which is thus produced in the upper layer is printed by means of blue light on an intermediate film which is sensitive to green or red light; whereby a positive or a reversal negative which can be used as the second partial color picture in the production of the colored picture may be obtained according to requirement. The original negative in the uppermost layer is removed by means of hot water mechanically or with the aid of a silver solvent chemically. Then the second blue sensitive layer is developed with the aid of an alkaline developer, to which the hitherto impermeable intermediate layer is now permeable. Thus all three partial color pictures are separately available for the printing process.

If a film with three superimposed emulsion layers is used, two intermediate layers which are permeable for solutions of different pH-values are applied. If, for instance, the upper intermediate layer is only permeable to an alkaline developer, and the lower intermediate layer is only permeable to an acid developer, the upper emulsion layer is developed with a ferrous oxalate developer to which the first intermediate layer is not permeable, then an intermediate positive is printed from that developed picture, then the intermediate layer between the two emulsion layers is rendered permeable by particular alkaline intermediate baths, or the second partial color picture is produced in an alkaline developer which cannot pass through the second intermediate layer. Finally, by the repeated use of an acid developer as it was used for developing the first emulsion layer and to which the second intermediate layer is permeable, the third partial color picture is developed.

The single figure of the accompanying drawing shows a film in accordance with the present invention. The support 1 is provided on one side with a silver halide emulsion layer 2 and on the other side with two silver halide emulsion layers 3 and 4 in superimposition and separated by an intermediate layer 5 of the kind as described above.

What we claim is:

1. A photographic material comprising a support and attached to said support silver halide emulsion layers arranged in superimposition, the silver halide emulsion layers being separated by intermediate layers strongly adhering to said silver halide emulsion layers and being made from a solution of 40 cc. of the solution used for the preparation of sublayers on films and containing proteid substances in an organic solvent, 10 cc. of acetone and 1 cc. of a 8 to 10 per cent solution of cellulose acetate.

2. A photographic material comprising a support and attached to said support silver halide emulsion layers arranged in superimposition, the silver halide emulsion layers being separated by intermediate layers strongly adhering to said silver halide emulsion layers and being made from a solution of 45 grams of gelatin, 135 grams of a condensation product of maleic acid anhydride with colophony, 150 cc. of water, 7.5 grams of phthalic acid, 1.8 liters of methanol and 2 cc. of a 40 per cent solution of formaldehyde.

3. A photographic material comprising a support and attached to said support silver halide emulsion layers arranged in superimposition, the silver halide emulsion layers being separated by intermediate layers strongly adhering to said silver halide emulsion layers and being made from a solution of 45 grams of gelatin, 135 grams of diphenylguanidine, 150 cc. of water, 50 cc. of ammonia conc., 1.8 liters of methanol and 2 cc. of a 40 per cent solution of formaldehyde.

4. A photographic material comprising a support and attached to said support silver halide emulsion layers arranged in superimposition, the silver halide emulsion layers being separated by intermediate layers inseparable therefrom, said intermediate layers comprising a mixture of a hydrophilic and a hydrophobic colloid, the hydrophobic colloid being present in such an amount as to make the layers impermeable to the aqueous treating liquids used for obtaining the component picture in the silver halide emulsion layer superimposed on the intermediate layer, said hydrophobic component being, however, capable of saponification, thus being rendered permeable for the aqueous treating liquids employed for obtaining the component picture in the silver halide emulsion layer arranged under the intermediate layer.

JOHN EGGERT.
GERD HEYMER.